(12) United States Patent
Hara et al.

(10) Patent No.: US 9,960,416 B2
(45) Date of Patent: May 1, 2018

(54) POSITIVE ELECTRODE FOR NON-AQUEOUS ELECTROLYTE SECONDARY BATTERY, NON-AQUEOUS ELECTROLYTE SECONDARY BATTERY AND BATTERY MODULE

(75) Inventors: Tomitaro Hara, Tokyo (JP); Takao Fukunaga, Tokyo (JP); Takayasu Iguchi, Tokyo (JP); Takao Kitagawa, Tokyo (JP); Yoshitaka Yamamoto, Tokyo (JP)

(73) Assignee: SUMITOMO OSAKA CEMENT CO., LTD. (JP)

( * ) Notice: Subject to any disclaimer, the term of this patent is extended or adjusted under 35 U.S.C. 154(b) by 100 days.

(21) Appl. No.: 13/993,901

(22) PCT Filed: Dec. 14, 2011

(86) PCT No.: PCT/JP2011/078915
§ 371 (c)(1),
(2), (4) Date: Jun. 13, 2013

(87) PCT Pub. No.: WO2012/081621
PCT Pub. Date: Jun. 21, 2012

(65) Prior Publication Data
US 2013/0266843 A1    Oct. 10, 2013

(30) Foreign Application Priority Data

Dec. 17, 2010  (JP) .................................. 2010-282433
Dec. 17, 2010  (JP) .................................. 2010-282434

(51) Int. Cl.
*H01M 4/131*  (2010.01)
*H01M 4/36*   (2006.01)
(Continued)

(52) U.S. Cl.
CPC ............ *H01M 4/366* (2013.01); *H01M 4/131* (2013.01); *H01M 4/133* (2013.01); *H01M 4/136* (2013.01);
(Continued)

(58) Field of Classification Search
CPC .... H01M 4/366; H01M 4/583; H01M 10/052; H01M 4/136; H01M 4/131; H01M 4/5825
See application file for complete search history.

(56) References Cited

U.S. PATENT DOCUMENTS

2009/0068560 A1* 3/2009 Hasumi et al. ................ 429/221
2009/0087660 A1* 4/2009 Suzuki .................. H01M 4/366
                                                          428/403
(Continued)

FOREIGN PATENT DOCUMENTS

CN    101295786 A    10/2008
CN    101399336 A    4/2009
(Continued)

OTHER PUBLICATIONS

Machine Translation of JP 2003-308845 A.*
(Continued)

*Primary Examiner* — Jonathan G Jelsma
(74) *Attorney, Agent, or Firm* — Merchant & Gould P.C.

(57) ABSTRACT

The present invention provides a positive electrode for a non-aqueous electrolyte secondary battery in which the charge/discharge rate of a secondary battery is increased by increasing the discharge/discharge rate of the positive electrode as a result of increasing the rate of incorporation and release of lithium ions in olivine-type phosphorous complex compound particles, a non-aqueous electrolyte secondary battery provided with this positive electrode for a non-aqueous electrolyte secondary battery, and a battery module
(Continued)

provided with this non-aqueous electrolyte secondary battery. The positive electrode for a non-aqueous electrolyte secondary battery of the present invention is a positive electrode for a non-aqueous electrolyte secondary battery containing olivine-type lithium complex compound particles having a carbonaceous film formed on the surface thereof as a positive electrode active material, in which the coverage factor of the carbonaceous film relative to the surface area of the olivine-type lithium complex compound particles is preferably 95% or more, and the packed density of the olivine-type lithium complex compound particles in this positive electrode for a non-aqueous electrolyte secondary battery is preferably 0.90 g/cm$^3$ to 1.09 g/cm$^3$.

8 Claims, 6 Drawing Sheets

(51) Int. Cl.

| | | |
|---|---|---|
| *H01M 4/136* | (2010.01) | |
| *H01M 4/58* | (2010.01) | |
| *H01M 4/583* | (2010.01) | |
| *H01M 10/052* | (2010.01) | |
| *H01M 4/133* | (2010.01) | |
| *H01M 4/02* | (2006.01) | |

(52) U.S. Cl.
CPC .......... *H01M 4/362* (2013.01); *H01M 4/583* (2013.01); *H01M 4/5825* (2013.01); *H01M 10/052* (2013.01); *H01M 2004/021* (2013.01); *Y02T 10/7011* (2013.01)

(56) References Cited

U.S. PATENT DOCUMENTS

| | | | |
|---|---|---|---|
| 2009/0317718 A1* | 12/2009 | Imachi .................. | H01M 4/13 429/212 |
| 2010/0279117 A1 | 11/2010 | Gu | |
| 2011/0045361 A1* | 2/2011 | Abe .................. | H01M 10/0568 429/343 |
| 2012/0015249 A1* | 1/2012 | Awano et al. ................ | 429/221 |

FOREIGN PATENT DOCUMENTS

| | | |
|---|---|---|
| CN | 101651236 A | 2/2010 |
| CN | 101777636 A | 7/2010 |
| JP | 2003-272632 A | 9/2003 |
| JP | A-2003-292308 | 10/2003 |
| JP | A-2003-292309 | 10/2003 |
| JP | A-2003-308845 | 10/2003 |
| JP | A-2007-173134 | 7/2007 |
| JP | A-2007-213961 | 8/2007 |
| JP | A-2007-265923 | 10/2007 |
| JP | A-2009-048958 | 3/2009 |
| JP | 4286288 B | 6/2009 |
| JP | A-2009-187963 | 8/2009 |
| JP | A-2009-206085 | 9/2009 |
| JP | A-2009-277661 | 11/2009 |
| JP | A-2009-295566 | 12/2009 |
| JP | A-2010-218884 | 9/2010 |
| JP | A-2010-231958 | 10/2010 |
| JP | A-2012-059532 | 3/2012 |
| KR | 10-2007-0010103 A | 1/2007 |
| KR | 10-2009-0102138 A | 9/2009 |
| KR | 10-2010-0029501 A | 3/2010 |
| KR | 10-2010-0131921 A | 12/2010 |

OTHER PUBLICATIONS

International Search Report for corresponding International Patent Application No. PCT/JP2011/078915 (dated Mar. 13, 2012).
Office Action for Japanese Application No. 2010-282433 (dated Nov. 25, 2014).
Office Action for Japanese Application No. 2010-282434 (dated Nov. 25, 2014).
Office Action for Chinese Application No. 201180059438.1 (dated Dec. 1, 2014).
Qian et al., "Template-Free Hydrothermal Synthesis of Nanoembossed Mesoporous LiFePO4 Microsphese for High-Performance Lithium-Ion Batteries," *J. Phys. Chem.*, 114(8):3477-82.
Office Action for Chinese Patent Application No. 201180059438.1 (dated Jul. 27, 2015).
Office Action for Chinese Patent Application No. 201180059438.1 (dated Jun. 14, 2016).
Office Action for Korean Patent Application No. 10-2013-7015146 (dated Jan. 19, 2018).
Third Party Observation for European Patent Application No. 11848054.0 (dated Jan. 23, 2018).

* cited by examiner

POSITIVE ELECTRODE FOR NON-AQUEOUS ELECTROLYTE SECONDARY BATTERY, NON-AQUEOUS ELECTROLYTE SECONDARY BATTERY AND BATTERY MODULE

This application is a U.S. National Stage Application under 35 U.S.C. § 371 of International Patent Application No. PCT/JP2011/078915 filed 14 Dec. 2011, which claims the benefit of priority to Japanese Patent Application No. 2010-282433 filed 17 Dec. 2010 and Japanese Patent Application No. 2010-282434, filed 17 Dec. 2010, the disclosures of all of which are hereby incorporated by reference in their entireties. The International Application was published in Japanese on 21 Jun. 2012 as WO 2012/081621.

TECHNICAL FIELD

The present invention relates to a positive electrode for a non-aqueous electrolyte secondary battery, a non-aqueous electrolyte secondary battery and a battery module.

BACKGROUND

A non-aqueous electrolyte secondary battery, which contains olivine-type lithium complex compound particles for the positive electrode active material thereof, has recently been proposed for use as a battery expected to offer reduced size, lighter weight and higher capacity, and has been provided for practical use (see, for example, Patent Documents 1 and 2).

This non-aqueous electrolyte secondary battery is composed of a positive electrode, which uses a lithium-containing phosphoric acid compound having an olivine structure, a negative electrode, which uses a lithium-containing metal oxide having the property of being able to reversibly incorporate and release lithium ions of a carbon-based material and the like, and a non-aqueous electrolyte.

This positive electrode is formed by coating a positive electrode material mixture, which contains olivine-type lithium complex compound particles such as lithium iron phosphate ($LiFePO_4$) particles, the surface of which is covered with a carbonaceous film, and a binder, onto the surface of a metal foil referred to as a current collector.

Since this type of non-aqueous electrolyte secondary battery is lighter, more compact and has higher energy in comparison with conventional secondary batteries such as lead batteries, nickel-cadmium batteries or nickel-hydrogen batteries, it is used as a power supply of portable electronic devices such as cell phones or laptop personal computers. In addition, non-aqueous electrolyte secondary batteries have recently been considered for use as high-output power supplies of electric vehicles, hybrid vehicles or power tools and the like, and these batteries used as high-output power supplies are required to have rapid charge/discharge properties.

In addition, non-aqueous electrolyte has been conventionally used in high output, high energy density secondary batteries, and secondary batteries are known that carry out charging and discharging by migration of lithium ions. In recent years, the use of olivine-type lithium-containing phosphoric acid salts such as lithium iron phosphate has been examined in order to improve stability at high temperatures (see, for example, Patent Document 3).

PRIOR ART DOCUMENTS

Patent Documents

Patent Document 1: Japanese Unexamined Patent Application, First Publication No. 2009-48958
Patent Document 2: Japanese Unexamined Patent Application, First Publication No. 2009-206085
Patent Document 3: Japanese Unexamined Patent Application, First Publication No. 2007-265923

SUMMARY OF INVENTION

Problems to be Solved by the Invention

However, since the surfaces of olivine-type lithium complex compound particles in the positive electrode materials of conventional non-aqueous electrolyte secondary batteries were not adequately covered with a carbonaceous film, the incorporation and release rates of lithium ions in the olivine-type complex compound was slow, or in other words, there was the problem of overvoltage ending up becoming high due to high charge transfer resistance.

In the case overvoltage of a positive electrode has become high, electrode resistance during charging and discharging also becomes high, and as a result thereof, the charge/discharge rate of the secondary battery ends up becoming slow, thereby resulting in the problem of a decrease in charge/discharge properties.

In order to solve the aforementioned problems, an object of the present invention is to provide a positive electrode for a non-aqueous electrolyte secondary battery that increases the charge/discharge rate of the positive electrode by increasing the rate at which lithium ions are incorporated and released in olivine-type lithium complex compound particles, and accordingly, increasing the charge/discharge rate of the secondary battery, a non-aqueous electrolyte secondary battery provided with this positive electrode for a non-aqueous electrolyte secondary battery, and a battery module provided with this non-aqueous electrolyte secondary battery.

On the other hand, since secondary batteries using a conventional olivine-type lithium complex compound for the positive electrode active material have high positive electrode resistance, a 100% state of charge (SOC) was unable to be obtained even if charged in the vicinity of a theoretical value of 3.35 V. Consequently, a high voltage of 4.0 V or higher had to be applied. However, if charging is carried out at 4.0 V or higher, reactions such as decomposition of electrolyte occur on the electrode that do not contribute to the cell reactions, thereby resulting in the possibility of having an effect on durability and stability of the battery.

In addition, in consideration of the aforementioned problems, an object of the present invention is to provide a non-aqueous electrolyte secondary battery that enables charging at a low voltage by lowering the resistance of the positive electrode that uses an olivine-type lithium complex compound.

Means for Solving the Problems

As a result of conducting extensive studies to solve the aforementioned problems, the inventors of the present invention found that, if the coverage factor of a carbonaceous film relative to the surface area of olivine-type lithium complex compound particles is made to be 95% or more in a positive electrode for a non-aqueous electrolyte secondary battery containing olivine-type lithium complex compound particles having a carbonaceous film formed on the surface thereof, the rate of incorporation and release of lithium ions in the olivine-type lithium complex compound can be increased, the charge/discharge rate of the positive electrode can be correspondingly increased, and as a result thereof, the charge/discharge rate of the secondary battery can be increased, thereby leading to completion of the present invention.

Namely, the positive electrode for a non-aqueous electrolyte secondary battery of the present invention is characterized by being a positive electrode for a non-aqueous electrolyte secondary battery containing olivine-type lithium complex compound particles having a carbonaceous film formed on the surface thereof as a positive electrode active material, wherein the coverage factor of the carbonaceous film relative to the surface area of the olivine-type lithium complex compound particles is 95% or more.

The packed density of the aforementioned olivine-type lithium complex compound particles in the aforementioned positive electrode for a non-aqueous electrolyte secondary battery is preferably 0.90 g/cm$^3$ to 1.09 g/cm$^3$.

The non-aqueous electrolyte secondary battery of the present invention is characterized in that it is provided with the positive electrode for a non-aqueous electrolyte secondary battery of the present invention.

The battery module of the present invention is characterized in that it is provided with the non-aqueous electrolyte secondary battery of the present invention.

In addition, the present invention employs the following configuration in order to solve the aforementioned problems.

In a non-aqueous electrolyte secondary battery that uses a positive electrode containing a carbon-coated, olivine-type lithium complex compound as a positive electrode active material, the aforementioned positive electrode has a positive electrode active material layer containing 4 parts by weight to 6 parts by weight of a conductive material and 4 parts by weight to 8 parts by weight of a binder based on 100 parts by weight of the positive electrode active material, and the carbon coverage area ratio of the carbon-coated, olivine-type complex compound particles is 95% or more.

Effects of the Invention

According to the positive electrode for a non-aqueous electrolyte secondary battery of the present invention, since the coverage factor of a carbonaceous film relative to the surface area of olivine-type lithium complex compound particles having a carbonaceous film formed on the surface thereof is made to be 95% or more, the rate of incorporation and release of lithium ions in the olivine-type lithium complex compound can be increased, and the charge/discharge rate of the positive electrode can be increased. As a result, the charge/discharge rate of a secondary battery that uses this positive electrode for a non-aqueous electrolyte secondary battery can be increased.

According to the non-aqueous electrolyte secondary battery of the present invention, since it is provided with the positive electrode for a non-aqueous electrolyte secondary battery of the present invention, the charge/discharge rate of the positive electrode can be improved. Thus, the charge/discharge properties of the secondary battery can be improved.

According to the battery module of the present invention, since it is provided with the non-aqueous electrolyte secondary battery of the present invention, charge/discharge properties of the battery module can be improved.

In addition, according to the present invention, a non-aqueous electrolyte secondary battery can be provided that has low positive electrode resistance and can be charged at a low voltage.

DESCRIPTION OUT EMBODIMENTS

The following provides an explanation of a first aspect of the present invention in the form of an embodiment for carrying out a positive electrode for a non-aqueous electrolyte secondary battery, a non-aqueous electrolyte secondary battery, and a battery module.

Furthermore, this embodiment is specifically explained to facilitate a better understanding of the gist of the present invention, and unless specifically indicated otherwise, is not intended to limit the present invention.

Figure 1:
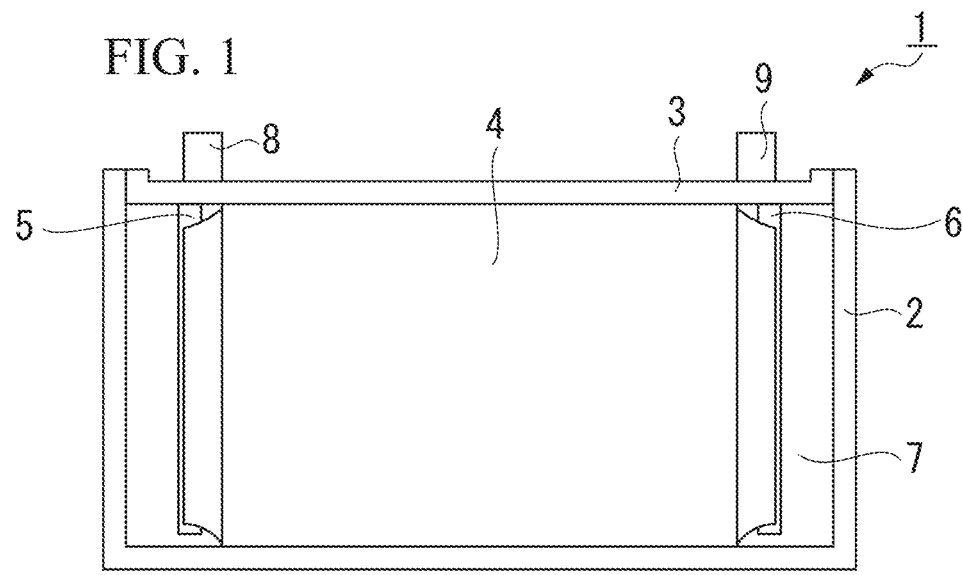
FIG. 1 is a schematic cross-sectional view depicted in the longitudinal direction of the configuration of a non-aqueous electrolyte secondary battery of one embodiment of the present invention.
Figure 2:
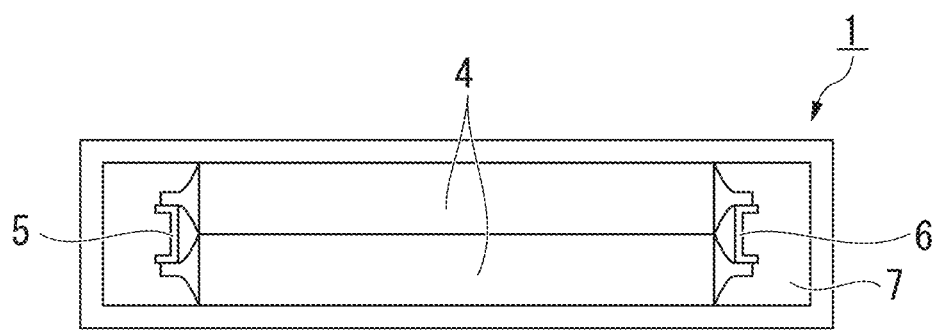
FIG. 2 is a schematic cross-sectional view depicted in the horizontal direction of the configuration of a non-aqueous electrolyte secondary battery of one embodiment of the present invention.

FIG. 1 is a schematic cross-sectional view depicted in the longitudinal direction showing the configuration of a non-aqueous electrolyte secondary battery provided with the positive electrode for a non-aqueous electrolyte secondary battery of the present invention (to also be simply referred to as a "secondary battery"), while FIG. 2 is a schematic cross-sectional view depicted in the horizontal direction showing the same secondary battery configuration.

A secondary battery 1 of the present embodiment is referred to as a lithium ion secondary battery and employs a sealed structure in which a lid member 3 is joined to an upper opening of a bottomed, cylindrical case 2 made of stainless steel and the like, a power generating element 4 employing a stacked structure, a positive electrode connection terminal 5, a negative electrode connection terminal 6 and a non-aqueous electrolyte 7 are housed in this case 2, the positive electrode connection terminal 5 and the negative electrode connection terminal 6 are fixed to the lid member 3 through insulators (not shown), the positive electrode connection terminal 5 is connected to a positive electrode external connection terminal 8, and the negative electrode connection terminal 6 is connected to a negative electrode external connection terminal 9.

Figure 3:
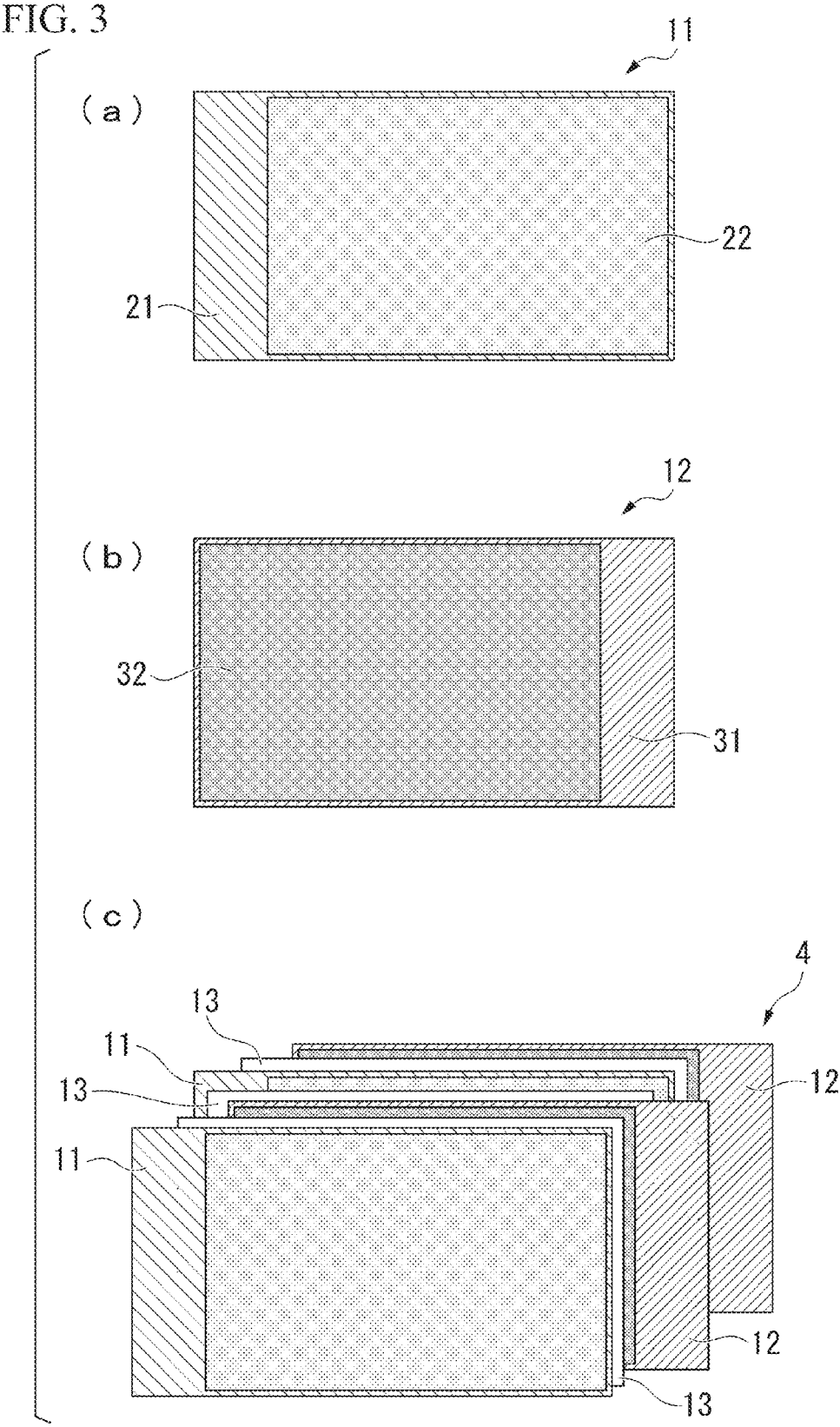
FIG. 3 is a perspective view showing the power generating element of a non-aqueous electrolyte secondary battery of one embodiment of the present invention, wherein (a) shows a positive electrode, (b) shows a negative electrode, and (c) shows the state in which the positive electrode, negative electrode and separators are arranged.

As shown in FIG. 3, the power generating element 4 is such that a sheet-like positive electrode 11 and a sheet-like negative electrode 12 are alternately arranged with a separator 13 interposed there between.

The positive electrode 11 is provided with a positive electrode current collector 21 and a positive electrode active material layer 22 formed on the positive electrode current collector 21. The positive electrode active material layer 22 may be formed only on one side of the positive electrode current collector 21 or may be formed on both sides of the positive electrode current collector 21. The ends of these positive electrode current collectors 21 where the positive electrode active material layer 22 is not formed are bundled and connected to the positive electrode connection terminal 5.

The positive electrode current collector 21 has electrical conductivity, and although there are no particular limitations thereon provided it allows the formation of the positive electrode active material layer 22 on the surface thereof, it is preferably, for example, metal foil, and this metal foil is preferably aluminum foil.

The positive electrode active material layer 22 is obtained by adding a conductive agent such as acetylene black, a binder such as polyvinylidene fluoride (PVdF) and an organic solvent such as N-methyl-2-pyrrolidone (NMP) to a positive electrode active material, and coating a stirred and mixed positive electrode active material layer slurry onto the positive electrode current collector 21 followed by heating and drying, and olivine-type lithium complex compound particles having a carbonaceous film formed on the surface thereof are preferably used for the positive electrode active material.

Either or both of (1) olivine-type lithium complex compound particles in which a carbonaceous film is formed on the surface of the particles at a surface coverage factor of nearly 100%, and (2) aggregates of olivine-type lithium complex compound particles in which a carbonaceous film is formed on the surface of primary particles at a surface coverage factor of nearly 100% and secondary particles are formed by bonding of primary particles with the carbonaceous film interposed there between, can be used for the olivine-type lithium complex compound particles having a carbonaceous film formed on the surface thereof.

The olivine-type lithium complex compound particles preferably have as a main component thereof one type selected from the group consisting of lithium cobalt oxide, lithium nickel oxide, lithium manganese oxide, lithium titanium oxide and $Li_xA_yD_zPO_4$ (wherein, A represents one type or two or more types selected from the group consisting of Co, Mn, Ni, Fe, Cu and Cr, D represents one type or two or more types selected from the group consisting of Mg, Ca, S, Sr, Ba, Ti, Zn, B, Al, Ga, In, Si, Ge, Sc, Y and rare earth elements, $0<x<2$, $0<y<1.5$ and $0\leq z<1.5$).

Here, A is preferably Co, Mn, Ni or Fe, and D is preferably Mg, Ca, Sr, Ba, Ti, Zn or Al from the viewpoints of high discharge potential, ample availability and safety.

Here, rare earth metals refer to the 15 members of the lanthanide series consisting of La, Ce, Pr, Nd, Pm, Sm, Eu, Gd, Tb, Dy, Ho, Er, Tm, Yb and Lu.

Among these lithium complex compounds, $LiFePO_4$ is preferable.

Since the carbonaceous film formed on the surface of the olivine-type lithium complex compound particles is formed by baking a carbon precursor such as pitch at 1000° C. or lower in an inert atmosphere, it is composed of amorphous carbon.

The coverage factor of the carbonaceous film relative to the surface area of the olivine-type lithium complex compound particles is preferably 95% or more.

Here, if the coverage factor of the carbonaceous film is less than 95%, the internal resistance of the olivine-type lithium complex compound particles increases, and as a result thereof, the rate at which lithium ions are incorporated and released in the olivine-type lithium complex compound particles decreases and the charge/discharge rate of the positive electrode decreases, thereby making this undesirable.

The packed density of the olivine-type lithium complex compound particles having a carbonaceous film formed on the surface thereof in the positive electrode active material layer 22 is preferably 0.90 g/cm³ to 1.09 g/cm³.

Here, if the packed density is less than 0.90 g/cm³, electrical resistance increases, thereby making this undesirable. Furthermore, the upper limit of packed density of 1.09 g/cm³ is the limit at which olivine-type lithium complex compound particles can be packed in the positive electrode, and it is difficult to increase packed density beyond this value.

In the case packed density is 1.09 g/cm³, electrical resistance of the positive electrode active material layer 25 approaches the resistance of amorphous carbon.

The following provides a more detailed explanation of the reason for making the coverage factor of the carbonaceous film to be 95% or more.

In the case of conventional olivine-type lithium complex compound particles having a carbonaceous film formed on the surface thereof, the rate at which lithium ions are incorporated and released in the lithium complex compound could not be said to be of a degree that was able to adequately satisfy requirements. In particular, electrical resistance of the positive electrode tended to increase at the end of charging and discharging, resulting in the disadvantage of a decrease in the charge/discharge rate.

The reason for this is thought to be that, since there are numerous portions present where the carbonaceous film is not present on the surface of the olivine-type lithium complex compound particles, portions end up being formed where the carbonaceous film does not cover electron acceptor sites in the olivine framework adjacent to Li ion reactive sites of the olivine-type lithium complex compound particles, thereby making it difficult to incorporate and release Li ions at those portions.

The reason for the numerous portions present where the carbonaceous film is not present on surface of the particles is thought to be that, since the coverage factor of a carbonaceous film on olivine-type lithium complex compound particles is considered to be inherently low, due to stirring and mixing when preparing a positive electrode active material layer slurry using these surface-coated olivine-type complex compound particles, the particles are subjected to excessive stress, and this is thought to cause separation of the carbonaceous film.

On the other hand, in the olivine-type lithium complex compound particles having a carbonaceous film formed on the surface thereof of the present invention, since the coverage factor of the carbonaceous film is made to be 95% or more, there are few portions where electron acceptor sites in the olivine framework adjacent to Li ion reactive sites of the olivine-type lithium complex compound particles are not covered with the carbonaceous film, and there are thought to be few regions where the incorporation and release of Li ions is inhibited.

In particular, in the case the coverage factor of the carbonaceous film is 100%, nearly all of the electron acceptor sites in the olivine framework adjacent to Li ion reactive sites of the olivine-type lithium complex compound particles are covered with the carbonaceous film, and the risk of incorporation and release of Li ions being inhibited is thought to be eliminated.

The negative electrode 12 is provided with a negative electrode current collector 31 and a negative electrode active material layer 32 formed on the negative electrode current collector 31.

The negative electrode current collector 31 has electrical conductivity, and although there are no particular limitations thereon provided it allows the formation of the negative electrode active material layer 32 on the surface thereof, it is preferably, for example, metal foil, and this metal foil is preferably copper foil.

The negative electrode active material layer 32 is obtained by adding a conductive agent such as acetylene black, a binder such as polyvinylidene fluoride (PVdF) and an organic solvent such as N-methyl-2-pyrrolidone (NMP) to a negative electrode active material, and coating a stirred and mixed negative electrode active material layer slurry onto the negative electrode current collector 31 followed by heating and drying, and for example, graphite, lithium metal, tin or titanium lithium oxide is preferably used for the negative electrode active material.

The separator 13 is arranged between the positive electrode 11 and the negative electrode 12, and although there are no particular limitations thereon provided it is able to prevent leakage current between the positive electrode 11 and the negative electrode 12, a microporous polyolefin film, for example, is used preferably.

Although there are no particular limitations on the non-aqueous electrolyte 7 provided it is a solution that contains an electrolyte involved in the cell reactions of the secondary battery 1, in the case of a lithium ion secondary battery, for example, an electrolytic solution obtained by dissolving a lithium salt in an organic solvent is used preferably.

Next, an explanation is provided of a method for producing the positive electrode of the present embodiment.

First, olivine-type lithium complex compound particles having a carbonaceous film formed on the surface thereof, a conductive agent such as acetylene black, a binder such as polyvinylidene fluoride (PVdF) and an organic solvent such as N-methyl-2-pyrrolidone (NMP) are stirred and mixed to produce a positive electrode active material layer slurry.

The coverage factor of the carbonaceous film on the surface of the olivine-type lithium complex compound particles can be maintained at 95% or more by controlling the duration of this stirring and mixing.

In addition, effects like those indicated below can be demonstrated.

(1) In the case the carbonaceous film is formed on the surface of the olivine-type lithium complex compound particles at a surface coverage factor of nearly 100%, damage to the carbonaceous film of primary particles can be inhibited by controlling the duration of stirring and mixing.

(2) In the case of aggregates of olivine-type lithium complex compound particles in which a carbonaceous film of a prescribed thickness is formed on the surface of primary particles of the olivine-type lithium complex compound particles at a surface coverage factor of nearly 100%, and secondary particles are formed by bonding of primary particles with the carbonaceous film interposed therebetween, a reduction in the coating rate of the carbonaceous film of primary particles on the outside of the aggregates can be inhibited when the carbonaceous film of the primary particles on the surface of the secondary particles is damaged and the secondary particles are broken up after pressing resulting in individual primary particles, by controlling the duration of stirring and mixing.

Next, this positive electrode active material layer slurry is coated to a uniform thickness on the positive electrode current collector using a roll coater and the like followed by heating and drying. As a result, a positive electrode active material layer is formed on the positive electrode current collector. This positive electrode active material layer may be formed only on one side of the positive electrode current collector or may be formed on both sides.

Next, the positive electrode current collector on which the positive electrode active material layer has been formed is pressed using a roll press and the like to impart a suitable thickness to the thickness of the positive electrode active material layer, thereby completing the positive electrode.

During pressing with this roll press, favorable packed density and porosity for use as an electrode for a non-aqueous electrolyte secondary battery can be obtained by pressing the positive electrode active material layer after drying. In the case of aggregates described in (2) above in particular, since secondary particles are broken up resulting in individual primary particles, a positive electrode active material layer is formed that has a high packed density.

The secondary battery 1 of the present embodiment is completed by assembling the power generating element 4 by alternately arranging the positive electrode 11 and the negative electrode 12 with the separator 13 interposed therebetween, housing the power generating element 4 and the non-aqueous electrolyte 7 in the case 2, respectively connecting the positive electrode connection terminal 5 and the positive electrode external connection terminal 8 to the positive electrode 11 and the negative electrode connection terminal 6 and the negative electrode external connection terminal 9 to the negative electrode 12, and fixing the positive electrode external connection terminal 8 and the negative electrode external connection terminal 9 to the lid member 3.

The battery module of the present embodiment is completed by connecting a plurality of the secondary battery 1 of the present embodiment in series or in parallel.

According to the positive electrode for a secondary battery of the present embodiment, since the coverage factor of the carbonaceous film relative to the surface area of olivine-type lithium complex compound particles having a carbonaceous film formed on the surface thereof is made to be 95% or more, the rate of incorporation and release of lithium ions in the olivine-type lithium complex compound can be increased, and the charge/discharge rate of the positive electrode can be increased. As a result, the charge/discharge rate of a secondary battery that uses this positive electrode for a secondary battery can be increased.

According to the secondary battery of the present embodiment, since it is provided with the positive electrode of the present embodiment, the charge/discharge rate of the positive electrode can be increased. Thus, the charge/discharge properties of the secondary battery can be improved.

According to the battery module of the present embodiment, since it is provided with the secondary battery of the present embodiment, the charge/discharge properties of the battery module can be improved.

The following provides an explanation of an embodiment that is a second aspect of the present invention with reference to the drawings. The constituents indicated in the drawings and subsequent descriptions are exemplary, and the scope of the present invention is not limited by the drawings and subsequent descriptions.

Figure 5:
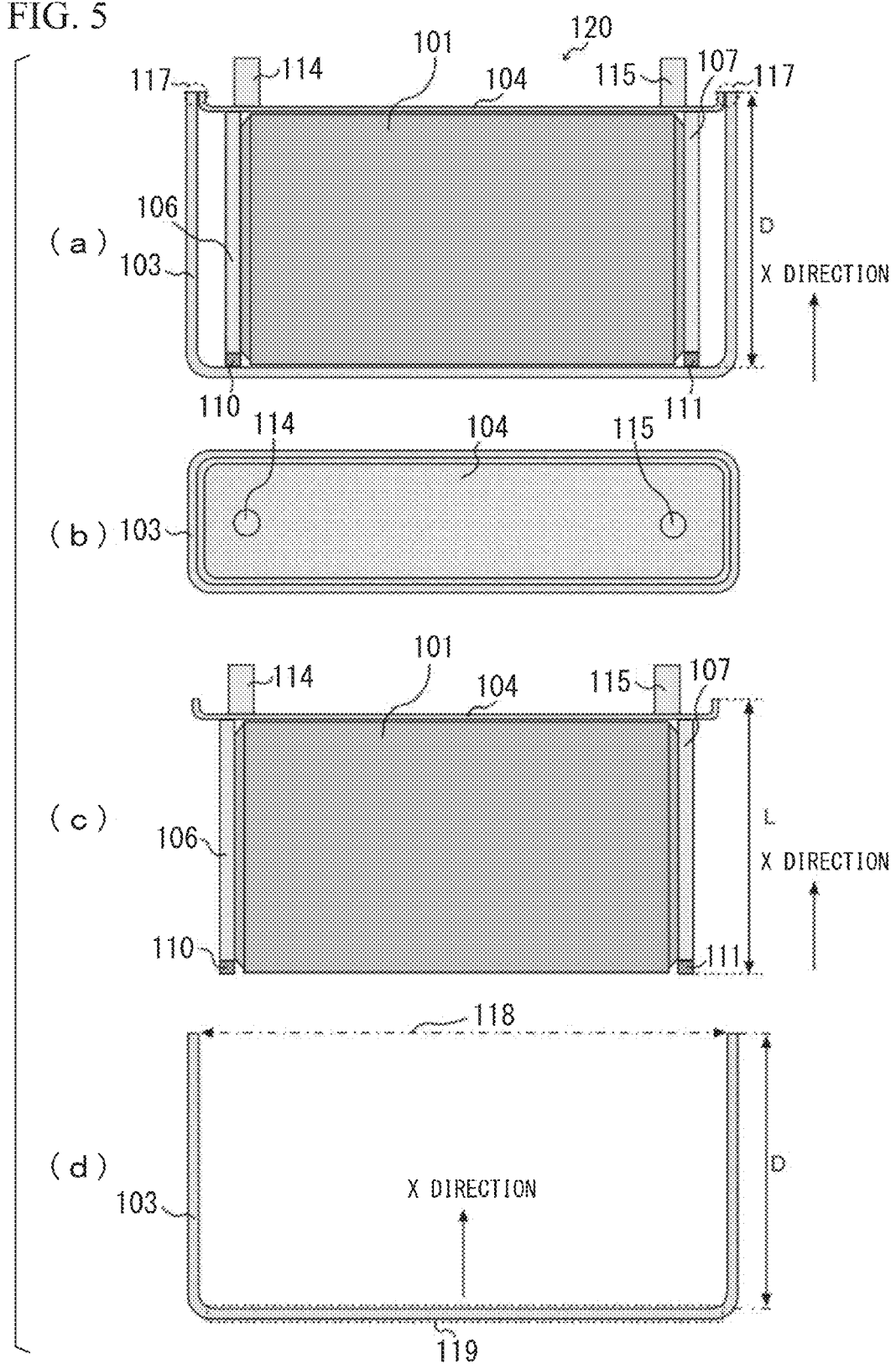
FIG. 5 is a drawing showing a secondary battery that is one embodiment of the present invention.

FIG. 5 is a drawing showing a secondary battery that is one embodiment of the present invention, FIG. 5(a) is a schematic cross-sectional view, FIG. 5(b) is a schematic overhead view, FIG. 5(c) is a schematic cross-sectional view of constituents excluding the case, and FIG. 5(d) is a cross-sectional view of the case.

Figure 6:
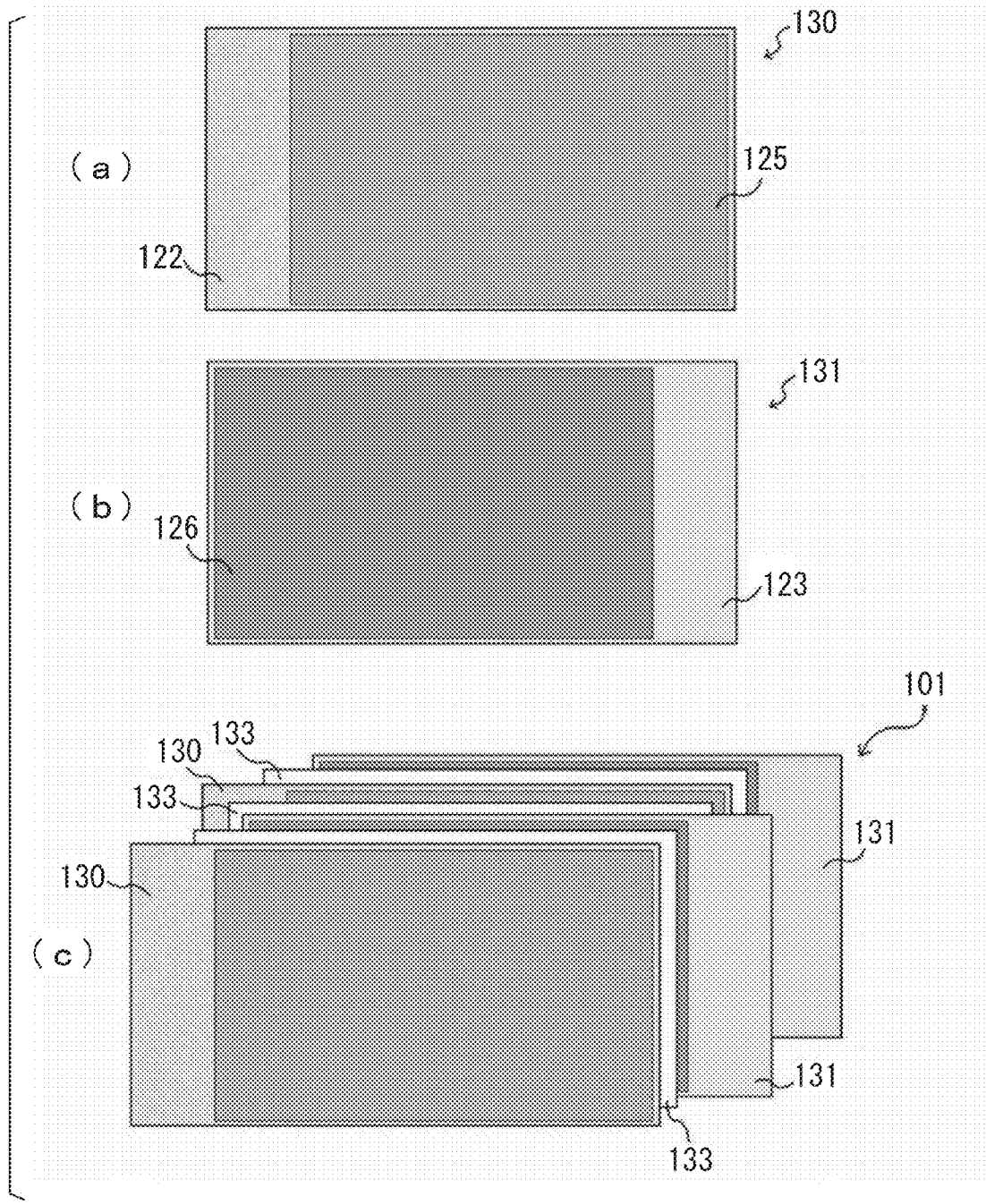
FIG. 6 is a drawing showing a power generating element contained in a secondary battery of an embodiment.

FIG. 6 is a drawing showing a power generating element contained in the secondary battery of the present embodiment, FIG. 6(a) is a schematic overhead view of a positive electrode sheet, FIG. 6(b) is a schematic overhead view of a negative electrode sheet, and FIG. 6(c) is a schematic diagram showing the internal structure of the power generating element.

A secondary battery 120 of the present embodiment is provided with a configuration in which a power generating element 101 employing a stacked structure is housed within a case 103 having an opening 118, and the opening 118 is sealed with a lid member 104. A positive electrode connection terminal 106, a negative electrode connection terminal 107, a positive electrode supporting member 110, a negative electrode supporting member 111 and an electrolyte are sealed within the case 103 together with the power generating element 101.

Within the case 103, the positive electrode connection terminal 106 is connected to one end in the lengthwise direction of the power generating element 101, and the negative electrode connection terminal 107 is connected to the other end. The positive electrode connection terminal 106 and the negative electrode connection terminal 107 are respectively fixed to the lid member 104. The positive electrode supporting member 110 is fixed to the end of the positive electrode connection terminal 106 on the side of the bottom wall of the case 103, and the negative electrode supporting member 111 is fixed to the end of the negative electrode connection terminal 107 on the side of the bottom wall of the case 103. The positive electrode supporting member 110 and the negative electrode supporting member 111 are in direct contact or make contact through another member on the inside of the bottom wall of the case 103.

The lid member 104 has a size that is substantially the same as the size of the opening 118 of the case 103. In the case of the present embodiment, a depth D of the case 103 and a length L when the power generating element 101 is attached to the lid member 104 are nearly equal. As a result, when the power generating element 101 and the like is housed in the case 103, the positive electrode supporting member 110 and the negative electrode supporting member 111 are pressed against a bottom surface 119 of the case 103, and the edges of the lid member 104 and the end edges of the opening 118 are arranged so as to be nearly aligned when viewed from the side while in this state.

The positive electrode connection terminal 106 and the negative electrode connection terminal 107 are fixed to the lid member 104 inside the case 103. A positive electrode external connection terminal 114 and a negative electrode external connection terminal 115 are fixed to the outside of the lid member 104. The positive electrode external connection terminal 114 is electrically connected to the positive electrode connection terminal 106. The negative electrode external connection terminal 115 is electrically connected to the negative electrode connection terminal 107.

The edges of the lid member 104 and the end edges of the opening 118 of the case 103 are joined to be airtight to form a seal 117. As a result, electrolyte of the secondary battery 120 is sealed within the case 103. There are no particular limitations on the method used to form the seal 117, and for example, laser welding, resistance welding, ultrasonic welding or adhesion using an adhesive can be used.

As shown in FIG. 6, the power generating element 101 has a positive electrode sheet 130 and a negative electrode sheet 131 alternately laminated with a separator 133 interposed there between. The positive electrode sheet 130 has a positive electrode current collector 122 connected to the positive electrode connection terminal 106 and a positive electrode active material layer 125 formed on the positive electrode current collector 122. The negative electrode sheet 131 has a negative electrode current collector 123 connected to the negative electrode connection terminal 107 and a negative electrode active material layer 126 formed on the negative electrode current collector 123.

There may each be more than one of the positive electrode sheet 130 and the negative electrode sheet 131 that compose the power generating element 101. Namely, a plurality of the positive electrode sheets 130 and a plurality of the negative electrode sheets 131 may be alternately laminated with the separators 133 interposed there between. In this case, the plurality of positive electrode sheets 130 are bundled at the end of the positive electrode current collector 122 where the positive electrode active material layer 125 is not formed, and connected to the positive electrode connection terminal 106. Similarly, the plurality of negative electrode sheets 131 are bundled at the end of the negative electrode current collector 123 where the negative electrode active material layer 126 is not formed, and connected to the negative electrode connection terminal 107. In the case of bundling the ends of current collectors in this manner, the separators 133 may be extended to the vicinity of the portions where the positive electrode current collector 122 and the negative electrode current collector 123 are respectively bundled in order to prevent leakage current between the positive electrode current collector 122 and the negative electrode current collector 123.

In addition, a plurality of the power generating elements 101 may also be arranged in the case 103. In this case, the plurality of power generating elements 101 can be connected to a single positive electrode connection terminal 106 and negative electrode connection terminal 107.

The positive electrode sheet 130 has the positive electrode current collector 122 and the positive electrode active material layer 125.

The positive electrode current collector 122 has electrical conductivity, and there are no particular limitations on the material, shape or size thereof provided it is able to retain the positive electrode active material layer 125 on one side or both sides thereof. The positive electrode current collector 122 can be composed of, for example, metal foil, and preferably aluminum foil.

The positive electrode active material layer 125 contains positive electrode active material particles, a conductive material and a binder.

In the present embodiment, particles of olivine-type lithium iron phosphate having carbon covering the surface thereof, or aggregates thereof, are used for the positive electrode active material. Olivine-type lithium iron phosphate is represented by the general formula $Li_xFePO_4$ (wherein, $0<x\leq2$). Amorphous carbon, obtained by baking a carbon precursor such as pitch under conditions of 1000° C. or lower in an inert atmosphere, can be used for the carbon coating that covers the olivine-type lithium iron phosphate particles. In the present embodiment, the coverage area ratio of the carbon coating on the surface of the olivine-type lithium iron phosphate particles that compose the positive electrode active material layer 125 is preferably 95% and more preferably as close to 100% as possible.

Furthermore, the positive electrode active material is not limited to olivine-type lithium iron phosphate, but rather an olivine-type lithium complex compound represented by the general formula $Li_xMPO_4$ (wherein, M represents at least one type of element selected from Co, Ni, Mn and Fe, and $0<x\leq2$) can also be used. Namely, particles of an olivine-type lithium complex compound having carbon covering the surface thereof, or aggregates thereof, can be used.

The binder is used to bind the positive electrode current collector 122, the positive electrode active material particles and the conductive material. Examples of binders include organic solvent-based binders such as polytetrafluoroethylene (PTFE) as well as styrene-butadiene rubber (SBR) that can be dispersed in water; ethylenic unsaturated carboxylic acid esters such as methyl (meth)acrylate, ethyl (meth) acrylate, butyl (meth)acrylate, (meth)acrylonitrile or hydroxyethyl (meth)acrylate; ethylenic unsaturated carboxylic acids such as acrylic acid, methacrylic acid, itaconic acid, fumaric acid or maleic acid; and aqueous polymers such as carboxymethyl cellulose (CMC); and two or more types thereof can be used as a mixture. The solvent used to dissolve the binder is suitably selected corresponding to the type of binder. For example, one type or two or more types selected from dimethylformamide, N-methylpyrrolidone, isopropanol, toluene and water are used.

One type or two or more types of carbon materials selected from acetylene black, furnace black and carbon black can be used for the conductive material used in the positive electrode active material layer 125.

The material ratios of the positive electrode active material, conductive material and binder in the positive electrode active material layer 125 of the present embodiment is such that the amount of the conductive material is within the range of 4 parts by weight to 6 parts by weight and the amount of binder is within the range of 4 parts by weight to 8 parts by weight based on 100 parts by weight of the positive electrode active material.

If the amount of the conductive material is less than 4 parts by weight, a conductive network is not properly formed by carbon within the positive electrode and resistance increases. On the other hand, if the amount of the conductive material exceeds 6 parts by weight, conductivity no longer changes even if the added amount is increased. Since the conductive material does not contribute to the cell reactions, an excessive amount of the conductive material causes a decrease in the capacity per unit weight of the positive electrode.

In addition, if the amount of the binder exceeds 8 parts by weight, although bindability of the positive electrode active material layer 125 increases, conductivity ends up decreasing. In addition, if the amount of the binder is less than 4 parts by weight, the binding strength of the positive electrode active material layer 125 becomes excessively weak, thereby making it difficult to form the positive electrode active material layer 125 on the positive electrode current collector 122.

In addition, in the present embodiment, the packed density of the positive electrode active material layer 125 is preferably 0.90 $g/cm^3$ or more. As indicated by the relationship between packed density and electrode resistance in the following Table 1, in the case the packed density is 0.90 $g/cm^3$ or more, although resistance of the positive electrode sheet 130 is of an adequately small value, if the packed density is less than 0.90 $g/cm^3$, resistance of the positive electrode sheet 130 increases rapidly. Furthermore, "electrode resistance" refers to the AC resistance value.

TABLE 1

| Packed density | Electrode resistance |
| --- | --- |
| 0.82 $g/cm^3$ | 2.92 mΩ |
| 0.90 $g/cm^3$ | 0.96 mΩ |
| 0.95 $g/cm^3$ | 0.81 mΩ |

The negative electrode sheet 131 has the negative electrode current collector 123 and the negative electrode active material layer 126.

The negative electrode current collector 123 has electrical conductivity, and there are no particular limitations thereon provided it is able to retain the negative electrode active material layer 126 on one side or both sides thereof. The negative electrode current collector 123 can be composed of, for example, a metal film, and is preferably a copper film.

The negative electrode active material layer 126 at least contains a negative electrode active material. Graphite, lithium metal, tin or lithium titanium oxide, for example, can be used for the negative electrode active material. Among these, graphite is used preferably.

A binder may also be added to the negative electrode active material layer 126 as necessary. Examples of binders that can be used include PVdF, SBR and acrylic polymers.

The separator 133 is arranged between the positive electrode sheet 130 and the negative electrode sheet 131, and prevents the flow of leakage current between the positive electrode sheet 130 and the negative electrode sheet 131. The separator 133 may also be composed so as to be able to retain electrolyte. The separator 133 can be composed of a microporous olefin film made of, for example, polyethylene, polypropylene or polytetrafluoroethylene.

There are no particular limitations on the electrolyte, and a commonly used electrolyte can be used. For example, a non-aqueous electrolyte in which an electrolyte is dissolved in a non-aqueous solvent, or a gel polymer obtained by impregnating this non-aqueous electrolyte into a polymer such as polyethylene oxide or polyacrylonitrile, can be used.

Examples of non-aqueous solvents of a non-aqueous electrolyte include ethers, ketones, lactones, sulfolane-based compounds, esters and carbonates. Typical examples thereof include tetrahydrofuran, 2-methyl-tetrahydrofuran, y-butyl lactone, acetonitrile, dimethoxyethane, diethyl carbonate, propylene carbonate, ethylene carbonate, dimethylsulfoxide, sulfolane, 3-methyl-sulfolane, ethyl acetate, methyl propionate and mixed solvents thereof.

Although there are no particular limitations on the electrolyte that composes the non-aqueous electrolyte, $LiBF_4$, $LiPF_6$, $LiClO_4$, $CF_3SO_3Li$ or LiBOB (lithium bis(oxalato) borate) and the like can be used, and among these, $LiBF_4$, $LiClO_4$, $LiPF_6$ and LiBOB are preferable from the viewpoints of battery properties, safety in handling and the like.

In addition, an additive can also be added to the non-aqueous electrolyte as necessary. The combined use of one or more types selected from cyclic carbonates having an unsaturated bond or halogen atom and S=O bond-containing compounds is preferable for use as additive from the viewpoint of improving charge/discharge properties.

Examples of cyclic carbonates having an unsaturated bond or halogen atom include vinylene carbonate, fluoroethylene carbonate and vinyl ethylene carbonate.

In addition, examples of the aforementioned S=O bond-containing compounds include 1,3-propanesultone (PS), 1,3-propenesultone (PRS), 1,4-butanediol dimethane sulfonate, divinyl sulfone, 2-propynyl methane sulfonate, pentafluoromethane sulfonate, ethylene sulfite, vinyl ethylene sulfite, vinylene sulfite, methyl 2-propynyl sulfite, ethyl 2-propynyl sulfite, dipropynyl sulfite, cyclohexyl sulfite and ethylene sulfate, and 1,3-propane sultone, divinyl sulfone, 1,4-butanediol methane sulfonate and ethylene sulfite are particularly preferable.

One type of these compounds may be used or two or more types may be used in combination.

In the secondary battery 120 of the present embodiment provided with the configuration as described above, the positive electrode active material layer 125 that composes the positive electrode sheet 130 contains 4 parts by weight to 6 parts by weight of a conductive material and 4 parts by weight to 8 parts by weight of a binder based on 100 parts by weight of the positive electrode active material. As a result, the states of the positive electrode active material, the conductive material and the binder in the positive electrode active material layer 125 are optimized, and the positive electrode active material layer 125 can be obtained in which a network of an electrically conductive material is formed and which has low resistance. In addition, a non-aqueous electrolyte secondary battery provided with this type of low resistance positive electrode sheet 130 allows the obtaining of a high charging rate at a low voltage.

Furthermore, the secondary battery 120 of the present embodiment can also compose a battery module in which a plurality thereof are connected in series or in parallel using linking terminals and the like. As a result, a form can be obtained that can be preferably used in industrial fields requiring a comparatively large output, such as electrical power storage, hybrid electric vehicles or trains.

(Production Method of Positive Electrode Sheet)

A positive electrode sheet can be produced according to a production method having a step for stirring and mixing a positive electrode active material (carbon-coated olivine-type lithium iron phosphate particles or aggregates thereof), a conductive material (for example, acetylene black), a binder (for example, PVdF) and a solvent (for example, N-methylpyrrolidone) to prepare a positive electrode active material layer-forming slurry; a step for coating the positive electrode active material layer-forming slurry onto the positive electrode current collector 122 (for example, aluminum foil) followed by forming the positive electrode active material layer 125 on one side or both sides of the positive electrode current collector 122 by drying and solidifying; and a step for adjusting the thickness of the positive electrode active material layer 125 by pressing the positive electrode current collector 122 on which the positive electrode active material layer 125 has been formed with a roll press and the like.

In the production method of the present embodiment, in the step for preparing the positive electrode active material layer-forming slurry, energy such as excessive mechanical impact is preferably not allowed to act on the positive electrode active material during the mixing period after adding the positive electrode active material. More specifically, the duration of mixing time is preferably shortened within a range that allows the obtaining of a homogeneous mixture. As a result, the load on the positive electrode active material can be reduced, and partial separation of the carbon coating on the surface of the lithium iron phosphate particles can be prevented. As a result, a positive electrode active material can be formed that contains a positive electrode active material composed of olivine-type lithium iron phosphate particles in which is formed a carbon coating at a high coverage area ratio.

In a positive electrode sheet obtained according to the aforementioned production method, since the load on the carbon coating of the positive electrode active material can be reduced, the positive electrode active material layer 125 can be formed while maintaining a high coverage area ratio of the carbon coating on the surface of the olivine-type lithium iron phosphate particles, and a low resistance positive electrode sheet 130 can be produced.

Since olivine-type lithium iron phosphate per se does not have electrical conductivity, a carbon coating is formed on the surface of the particles in order to impart electrical conductivity. In such a positive electrode active material, if large number of portions where the carbon coating has separated from the particles (portions where the olivine-type lithium iron phosphate is exposed) are present, portions are formed where electron acceptor sites in the olivine framework adjacent to reactive sites of Li ions of the olivine-type lithium iron phosphate are not covered with carbon, and this is thought to impair the occurrence of incorporation and release of Li ions at those portions. Thus, if the coverage area ratio of carbon of the olivine-type lithium iron phosphate decreases, the rate of incorporation and release of Li ions decreases, and overvoltage is thought to end up increasing in the positive electrode.

In contrast, according to the production method of the present embodiment, the load on the carbon coating of the olivine-type lithium iron phosphate particles can be reduced, and the coverage area ratio of the carbon coating in the positive electrode active material in the positive electrode active material layer 125 can be made to be 95% or more. This being the case, since portions where the incorporation and release of Li ions is inhibited as previously described decrease and the rate of incorporation and release of Li ions improves, overvoltage in the positive electrode can be held to a low level.

Moreover, in the production method of the present embodiment, if a positive electrode active material having a carbon coating coverage area ratio of nearly 100% is used for the positive electrode active material (raw material) used to prepare the positive electrode active material layer-forming slurry, the carbon coverage area ratio of olivine-type lithium iron phosphate particles in the state of having formed the positive electrode active material layer 125 can be increased to nearly 100%, allowing the obtaining of particularly favorable results. This is thought to be because, since nearly all of the electron acceptor sites in the olivine framework adjacent to Li ion reactive sites of the olivine-type lithium iron phosphate are coated with carbon, incorporation and release of Li ions at the Li ion reactive sites is no longer inhibited.

Furthermore, the coverage area ratio of the carbon coating of the positive electrode active material can be measured by observing particles of the positive electrode active material using a scanning electron microscope (SEM) or energy-dispersive X-ray spectroscopy (EDX). Preparation of observation samples from the positive electrode sheet 130 can be carried out by a method consisting of immersing a portion of the positive electrode active material layer 125 in a solvent to dissolve the binder and separate particles of the positive electrode active material, or by a method consisting of removing a portion of the positive electrode active material layer 125 and extracting particles of the positive electrode active material.

The covering state of the carbon (carbon film thickness and film thickness distribution) can be confirmed by observing a cross-section of the positive electrode active material particles with an SEM. In addition, coverage area ratio can be calculated by obtaining the distribution state of carbon on the surface of the olivine-type lithium iron phosphate particles by mapping the surface of the positive electrode active material particles by EDX.

EXAMPLES

Although the following provides a detailed explanation of the present invention with examples and comparative examples, the present invention is not limited by these examples.

Example 1

A positive electrode active material in the form of aggregates of $LiFePO_4$ particles having a carbonaceous film coverage factor of 100% and a primary particle diameter of 0.1 μm to 2 μm (Sumitomo Osaka Cement Co., Ltd.), a conductive material in the form of acetylene black, and a binder in the form of polyvinylidene fluoride (PVdF) were weighed to a ratio of 100:5:7 (parts by weight), and the acetylene black and the polyvinylidene fluoride (PVdF) were added to N-methyl-2-pyrrolidone (NMP) in a mixer followed by stirring and mixing. Next, the aforementioned $LiFePO_4$ particles were added to the resulting mixture followed by mixing for 90 minutes at a mixer rotating speed of 100 rpm to prepare a slurry.

Next, this slurry was coated onto aluminum foil using a coater and dried followed by pressing using a press to form a positive electrode active material layer having a thickness of 100 μm on the aluminum foil and obtain a positive electrode of Example 1.

Next, a negative electrode was prepared by using graphite for the negative electrode active material, a plurality of this negative electrode and the aforementioned positive electrode were alternately arranged with separators interposed there between to assemble a power generating element, and the power generating element and a non-aqueous electrolyte were housed in a case followed by carrying out electrical wiring to prepare a secondary battery of Example 1.

Example 2

A positive electrode and secondary battery of Example 2 were prepared in compliance with Example 1 with the exception of setting the rotating speed of the mixer to 100 rpm and mixing for 150 minutes.

Comparative Example 1

A positive electrode and secondary battery of Comparative Example 1 were prepared in compliance with Example 1 with the exception of setting the rotating speed of the mixer to 100 rpm and mixing for 200 minutes.

[Evaluation]
(1) Carbonaceous Film Coverage Factor

The coverage factors of the carbonaceous film of the particles in the positive electrodes of Examples 1 and 2 and Comparative Example 1 were determined and evaluated.

Here, the state of the carbonaceous film on the surface of the particles was confirmed by immersing a portion of the positive electrode in organic solvent to dissolve the binder, or by removing a portion of the positive electrode and extracting $LiFePO_4$ particles having the carbonaceous film formed on the surface thereof, and observing these particles using a scanning electron microscope (SEM).

In addition, the state of the carbonaceous film on the surface of the particles was confirmed by analyzing the surface of the particles using energy-dispersive X-ray spectroscopy (EDX).

As a result, the coverage factor of the carbonaceous film was 98% to 100% in Example 1, 95% to 98% in Example 2, and 80% to 90% in Comparative Example 1, and it was determined that a shorter mixing time results in a higher coverage factor of the carbonaceous film on the particles in a positive electrode.

(2) Charge/Discharge Properties

Figure 4:
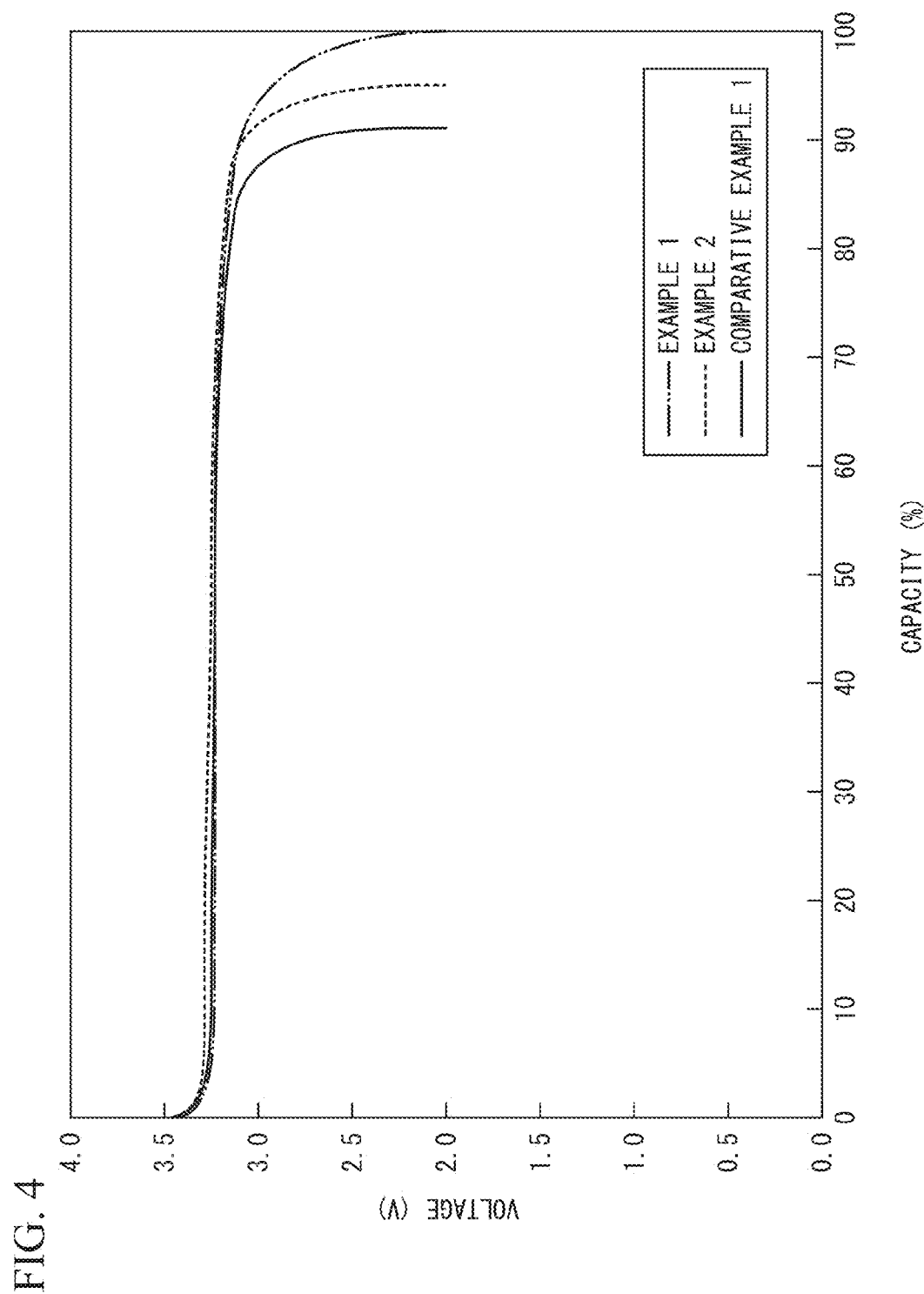
FIG. 4 is a drawing showing the charge/discharge properties of Examples 1 and 2 and Comparative Example 1 of the present invention.

A charge/discharge test was carried out on the secondary batteries of Examples 1 and 2 and Comparative Example 1 at room temperature (25° C.) under conditions of a cutoff voltage of 2 V to 4.5 V and constant current at a charge-discharge rate of 1 C (consisting of charging for 1 hour followed by discharging for 1 hour). The charge-discharge properties of Examples 1 and 2 and Comparative Example 1 are shown in FIG. 4.

As a result, a higher coverage factor of the carbonaceous film on the particles in a positive electrode was determined to result in higher capacity (%).

The reason for the increase in capacity of the positive electrode in this manner is thought to be due to the high coverage factor of the carbonaceous film, or in other words, as a result of an increase in the rate of incorporation and release of lithium ions of the positive electrode, overvoltage during the charging and discharging reactions of the positive electrode decreased, and as a result thereof, electrode resistance is thought to have decreased.

In addition, as a result of the carbonaceous film being connected in the form of an uninterrupted network among adjacent positive electrode active material particles, reliable conductive pathways were formed within the positive electrode, and resistance accompanying connections between the positive electrode active material particles is thought to have further decreased.

On the basis of the above, the charging rate of the positive electrode was able to be improved, and side reactions unrelated to inherent cell reactions, such as the decomposition reaction of electrolyte, were able to be prevented, thereby making it possible to improve safety and lifetime properties of the positive electrode in an overcharge test and the like.

Next, a plurality of samples of positive electrode sheets was prepared and the properties of batteries using each of these sheets were verified.

Example 3

A positive electrode sheet was prepared using the raw materials indicated below.

Positive electrode active material: LCP420 TU-4 (trade name, Sumitomo Osaka Cement Co., Ltd.)

Material Ratio of Positive Electrode Active Material Layer (Parts by Weight)

Positive electrode active material: acetylene black: PVdF=100:5:7

The aforementioned positive electrode active material consists of aggregates of olivine-type lithium iron phosphate particles, in which the surface of primary particles of olivine-type lithium iron phosphate are coated with carbon at a coverage area ratio of nearly 100% and in which secondary particles are formed by bonding primary particles with this carbon coating interposed there between. When the thickness of a positive electrode active material layer obtained by coating and drying a slurry is adjusted by pressing, the secondary particles are crushed by pressing and separated, thereby resulting in olivine-type lithium iron phosphate consisting nearly entirely of primary particles in the positive electrode active material layer.

After placing acetylene black and PVdF in N-methylpyrrolidone and carrying out stirring and mixing, positive electrode active material was added to the mixture followed by mixing for 90 minutes at a mixer rotating speed of 100 rpm to prepare a slurry. The aforementioned slurry was coated onto a positive electrode current collector in the form of aluminum foil using a coater and dried, and the resulting positive electrode active material layer was pressed to prepare a positive electrode sheet on which was formed a positive electrode active material layer having a thickness on one side of 100 μm and packed density of 0.95 g/cm$^3$.

Example 4

A positive electrode sheet was prepared under the same conditions as Example 3 with the exception of changing only the mixing time during preparation of the slurry.

After placing acetylene black and PVdF in N-methylpyrrolidone and carrying out stirring and mixing, the positive electrode active material was added to the mixture followed by mixing for 150 minutes at a mixer rotating speed of 100 rpm to prepare a slurry. The aforementioned slurry was coated onto aluminum foil using a coater and dried, and the resulting positive electrode active material layer was pressed to prepare a positive electrode sheet on which was formed a positive electrode active material layer having a thickness on one side of 100 μm and packed density of 0.95 g/cm$^3$.

Example 5

A positive electrode sheet was prepared under the same conditions as Example 3 with the exception of changing only the type of binder used during preparation of the slurry. The material ratio of the positive electrode active material layer (parts by weight) was such that positive electrode active material: acetylene black: modified polymethyl (meth)acrylate (modified PMMA): carboxymethyl cellulose (CMC)=100:5:4:2.

After placing the acetylene black, modified PMMA and CMC in N-methylpyrrolidone and carrying out stirring and mixing, the positive electrode active material was added to the mixture followed by mixing for 90 minutes at a mixer rotating speed of 100 rpm to prepare a slurry. The aforementioned slurry was coated onto aluminum foil using a coater and dried, and the resulting positive electrode active material layer was pressed to prepare a positive electrode sheet on which was formed a positive electrode active material layer having a thickness on one side of 100 μm and packed density of 0.95 g/cm$^3$.

Comparative Example 2

A positive electrode sheet was prepared under the same conditions as Example 3 with the exception of changing only the mixing time during preparation of the slurry.

After placing acetylene black and PVdF in N-methylpyrrolidone and carrying out stirring and mixing, the positive electrode active material was added to the mixture followed by mixing for 200 minutes at a mixer rotating speed of 100 rpm to prepare a slurry. The aforementioned slurry was coated onto aluminum foil using a coater and dried, and the resulting positive electrode active material layer was pressed to prepare a positive electrode sheet on which was formed a positive electrode active material layer having a thickness on one side of 100 μm and packed density of 0.95 g/cm$^3$.

Comparative Example 3

A positive electrode sheet was prepared under the same conditions as Example 3 with the exception of changing only the content of conductive material used during preparation of the slurry. The material ratio of the positive electrode active material layer (parts by weight) was such that positive electrode active material:acetylene black: PVdF=100:3:7.

After placing the acetylene black and PVdF in N-methylpyrrolidone and carrying out stirring and mixing, the positive electrode active material was added to the mixture followed by mixing for 90 minutes at a mixer rotating speed of 100 rpm to prepare a slurry. The aforementioned slurry was coated onto aluminum foil using a coater and dried, and the resulting positive electrode active material layer was pressed to prepare a positive electrode sheet on which was formed a positive electrode active material layer having a thickness on one side of 100 μm and packed density of 0.95 g/cm$^3$.

Comparative Example 4

A positive electrode sheet was prepared under the same conditions as Example 3 with the exception of changing only the content of binder used during preparation of the slurry. The material ratio of the positive electrode active material layer (parts by weight) was such that positive electrode active material:acetylene black:PVdF=100:5:9.

After placing the acetylene black and PVdF in N-methylpyrrolidone and carrying out stirring and mixing, the positive electrode active material was added to the mixture followed by mixing for 90 minutes at a mixer rotating speed of 100 rpm to prepare a slurry. The aforementioned slurry was coated onto aluminum foil using a coater and dried, and the resulting positive electrode active material layer was pressed to prepare a positive electrode sheet on which was formed a positive electrode active material layer having a thickness on one side of 100 μm and packed density of 0.95 g/cm$^3$.

Comparative Example 5

A positive electrode sheet was prepared under the same conditions as Example 3 with the exception of changing only the content of binder used during preparation of the slurry. The material ratio of the positive electrode active material layer (parts by weight) was such that positive electrode active material: acetylene black: PVdF=100:5:3.

After placing the acetylene black and PVdF in N-methylpyrrolidone and carrying out stirring and mixing, the positive electrode active material was added to the mixture followed by mixing for 90 minutes at a mixer rotating speed of 100 rpm to prepare a slurry. The aforementioned slurry was coated onto aluminum foil using a coater and dried, and the resulting positive electrode active material layer was pressed to prepare a positive electrode sheet on which was formed a positive electrode active material layer having a thickness on one side of 100 μm and packed density of 0.95 g/cm$^3$.

The material ratios and mixing times of the aforementioned Examples 3 to 5 and Comparative Examples 2 to 5 are shown in the following Table 2.

TABLE 2

| | Positive electrode active material | Conductive material | Binder |
|---|---|---|---|
| Example 3 | 100 (90 min) | 5 | 7 (PVdF) |
| Example 4 | 100 (150 min) | 5 | 7 (PVdF) |
| Example 5 | 100 (90 min) | 5 | 4 (PMMA) + 2 (CMC) |
| Comp. Ex. 2 | 100 (200 min) | 5 | 7 (PVdF) |
| Comp. Ex. 3 | 100 (90 min) | 3 | 7 (PVdF) |
| Comp. Ex. 4 | 100 (90 min) | 5 | 9 (PVdF) |
| Comp. Ex. 5 | 100 (90 min) | 5 | 3 (PVdF) |

Positive electrode active material particles were removed from the positive electrode sheets of Examples 3 and 4 and Comparative Example 2 and cross-sections thereof were measured by SEM and EDX to calculate the coverage area ratio of the carbon coating on the surface of the positive electrode active material particles. The coverage area ratio of the carbon coating of each sample is as indicated below.

Example 3 (mixing time: 90 min): 98% to 100%
Example 4 (mixing time: 150 min): 95% to 98%
Comparative Example 2 (mixing time: 200 min): 80% to 90%

Shortening of the mixing time in the slurry preparation step was found to increase the coverage area ratio of the carbon coating on the positive electrode active material particles in the positive sheets.

Figure 7:
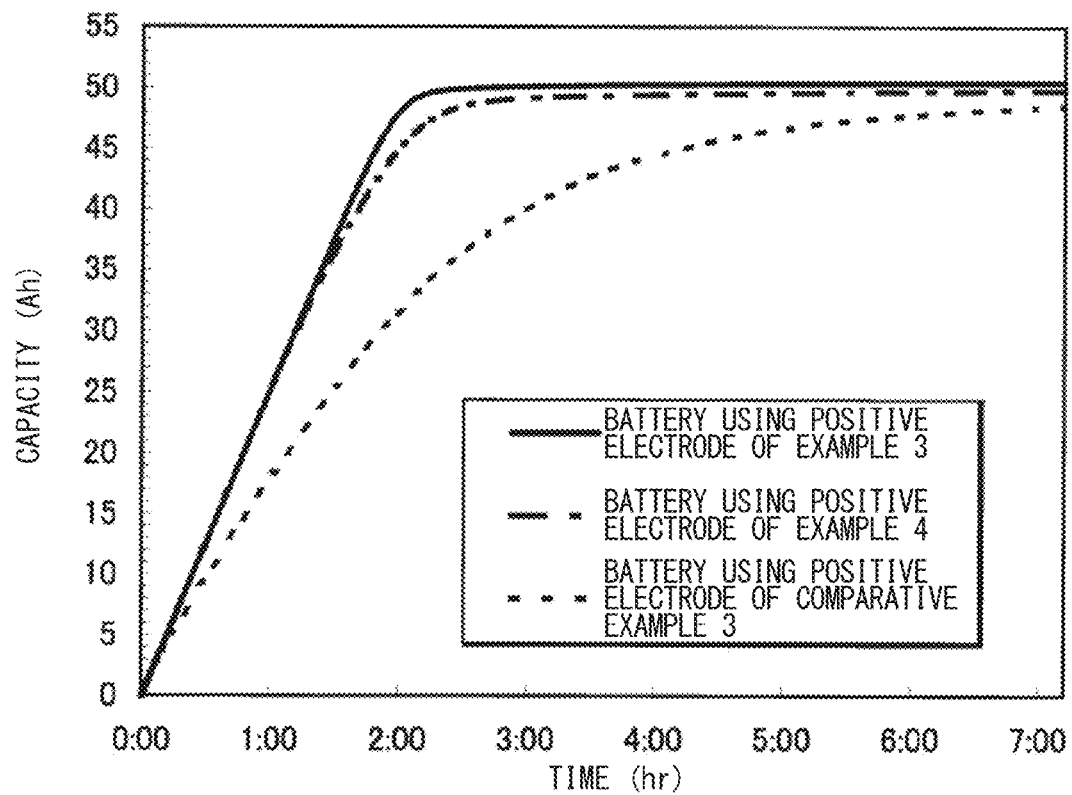
FIG. 7 is a graph showing the relationship between charging time and capacity of various samples.

Next, FIG. 7 is a graph showing the relationship between charging time and capacity of batteries produced using the positive electrode sheets of Examples 3 and 4 and Comparative Example 3.

The batteries used in the measurements indicating the results shown in FIG. 7 were produced by separately preparing a negative electrode sheet using graphite for the negative electrode active material, and laminating a plurality of positive electrode sheets and negative electrode sheets with separators interposed there between to produce non-aqueous electrolyte secondary batteries having a capacity of 50 Ah.

As shown in FIG. 7, the batteries using the positive electrode sheets of Examples 3 and 4 became fully charged (50 Ah) faster than the battery using the positive electrode sheet of Comparative Example 3. These results are thought to indicate that the previously indicated superior electrode properties of Examples 3 and 4 are also reflected in the batteries in which they are used.

The use of a positive electrode that uses olivine particles having a high coverage area ratio of carbon relative to the surface area of olivine-type lithium iron phosphate particles in a positive electrode sheet was determined to lead to the result of an increase in capacity.

The reason for the increase in positive electrode capacity is that, as a result of the high coverage factor of the carbon coating, or in other words, the rapid rate of incorporation and release of Li ions in the positive electrode, overvoltage during the charging and discharging reactions of the positive electrode decreases, and this is thought to result in a decrease in battery resistance.

In addition, since the carbon is connected in the form of an uninterrupted network among adjacent positive electrode active material particles, conductive pathways are reliably formed within the positive electrode, and resistance accompanying connections between the positive electrode active material particles is thought to have further decreased.

Next, the relationship between material ratio of the positive electrode active material layer and resistance value of the positive electrode sheet was verified.

(Ratio of Conductive Material)

A plurality of samples of positive electrode sheets were prepared while changing the range of the amount of conductive material from 3 parts by weight to 7 parts by weight based on 100 parts by weight of the positive electrode active material, after which the AC resistance of each sample was measured. Five types of samples were prepared under the same conditions as the sample of Example 3 with the exception of the ratio of conductive material. The results of measuring the AC resistance of each sample are shown in Table 3. As shown in Table 3, AC resistance of the positive electrode sheets increases rapidly when the ratio of conductive material is less than 4 parts by weight. On the other hand, the AC resistance of samples in which the ratio of conductive material was 6 parts by weight or more remained constant, and it was determined that it is not necessary for the ratio of conductive material to exceed 6 parts by weight.

TABLE 3

| Conductive material (parts by wt.) | Positive electrode AC resistance ($\Omega$) |
|---|---|
| 3 | 2.15 |
| 4 | 1.12 |
| 5 | 0.81 |
| 6 | 0.80 |
| 7 | 0.80 |

(Ratio of Binder)

A plurality of samples of positive electrode sheets were prepared while changing the range of the amount of binder from 3 parts by weight to 9 parts by weight based on 100 parts by weight of the positive electrode active material, after which the AC resistance of each sample was measured. Seven types of samples were prepared in the same manner as the sample of Example 3 with the exception of the ratio of binder. The results of measuring the AC resistance of each sample are shown in Table 4. As shown in Table 4, inadequate binding strength was unable to be obtained in the positive electrode active material layer and the positive electrode active material layer was unable to be retained on the positive electrode current collector when the ratio of binder was less than 3 parts by weight. On the other hand, AC resistance of the positive electrode sheets was found to increase rapidly when the ratio of binder exceeded 8 parts by weight.

TABLE 4

| Binder (parts by weight) | Positive electrode AC resistance ($\Omega$) |
|---|---|
| 3 | — |
| 4 | 0.79 |
| 5 | 0.81 |
| 6 | 1.20 |
| 7 | 1.46 |
| 8 | 1.98 |
| 9 | 2.83 |

INDUSTRIAL APPLICABILITY

According to the positive electrode for a non-aqueous electrolyte secondary battery of the present invention, as a result of having made the coverage factor of a carbonaceous film relative to the surface area of olivine-type lithium complex compound particles having a carbonaceous film formed on the surface thereof to be 95% or more, the rate of incorporation and release of lithium ions in the olivine-type lithium complex compound can be increased, and the charge/discharge rate of the positive electrode can be increased. As a result, the charge/discharge rate of a secondary battery that uses this positive electrode for a non-aqueous electrolyte secondary battery can also be increased.

According to the non-aqueous electrolyte secondary battery of the present invention, since it is provided with the positive electrode for a non-aqueous electrolyte secondary battery of the present invention, the charge/discharge rate of the positive electrode can be improved. Thus, the charge/discharge properties of the secondary battery can be improved.

According to the battery module of the present invention, since it is provided with the non-aqueous electrolyte secondary battery of the present invention, charge/discharge properties of the battery module can be improved.

In addition, according to the present invention, a non-aqueous electrolyte secondary battery can be provided that has low positive electrode resistance and can be charged at a low voltage.

On the basis of the above, the present invention is extremely useful industrially.

BRIEF DESCRIPTION OF THE REFERENCE SYMBOLS

1 Secondary battery
2 Case
3 Lid member
4 Power generating element
5 Positive electrode connection terminal
6 Negative electrode connection terminal
7 Non-aqueous electrolyte
8 Positive electrode external connection terminal
9 Negative electrode external connection terminal
11 Positive electrode
12 Negative electrode
13 Separator
21 Positive electrode current collector
22 Positive electrode active material layer
31 Negative electrode current collector
32 Negative electrode active material layer
120 Secondary battery
125 Positive electrode active material layer

We claim:

1. A positive electrode for a non-aqueous electrolyte secondary battery containing a positive electrode active material layer, wherein the positive electrode active material layer comprises a binder, a conductive material, and olivine-type lithium complex compound particles, wherein:
 a carbonaceous film is formed on the surface of the particles,
 the coverage factor of the carbonaceous film relative to the surface area of the olivine-type lithium complex compound particles is 95% or more, and the coverage factor is measured after a uniform mixture of the binder, the conductive material and the olivine-type lithium complex compound particles is prepared to form the positive electrode active material layer,
 the carbonaceous film consists of amorphous carbon, and
 the packed density of the olivine-type lithium complex compound particles in the layer is 0.90 g/cm$^3$ to 1.09 g/cm$^3$, wherein the packed density is a value obtained by the following formula:

packed density of olivine-type lithium complex compound particles in the layer =(weight of the olivine-type lithium complex compound particles in the layer) / (volume of the layer).

2. A non-aqueous electrolyte secondary battery provided with the positive electrode for a non-aqueous electrolyte secondary battery according to claim 1.

3. A battery module provided with the non-aqueous electrolyte secondary battery according to claim 2.

4. A non-aqueous electrolyte secondary battery that uses a positive electrode containing a carbon-coated, olivine-type lithium complex compound as a positive electrode active material, wherein the positive electrode has a positive electrode active material layer containing 4 parts by weight to 6 parts by weight of a conductive material and 4 parts by weight to 8 parts by weight of a binder based on 100 parts by weight of the positive electrode active material, and the carbon coverage area ratio of the carbon-coated, olivine-type complex compound particles is 95% or more, and wherein the coverage area is measured after a uniform mixture of the binder, the conductive material and the olivine-type lithium complex compound particles is prepared to form the positive electrode active material layer;
 the packed density of the olivine-type lithium complex compound particles in the layer is 0.90 g/cm$^3$ to 1.09 g/cm$^3$, wherein the packed density is a value obtained by the following formula:

packed density of olivine-type lithium complex compound particles in the layer =(weight of the olivine-type lithium complex compound particles in the layer) / (volume of the layer).

5. A battery module comprising connecting a plurality of the non-aqueous electrolyte secondary batteries according to claim 4.

6. A battery module provided with the non-aqueous electrolyte secondary battery according to claim 2.

7. A battery module comprising a plurality of the non-aqueous electrolyte secondary batteries according to claim 2.

8. The positive electrode for a non-aqueous electrolyte secondary battery according to claim 1, wherein the coverage factor is measured with a scanning electron microscope or energy-dispersive X-ray spectroscopy using observation samples, wherein the observation samples are obtained by:
 immersing a portion of the positive electrode active material layer in a solvent to dissolve the binder and separate particles of the positive electrode active material as the observation samples, or
 removing a portion of the positive electrode active material layer to extract particles of the positive electrode active material as the observation samples.

* * * * *

UNITED STATES PATENT AND TRADEMARK OFFICE
CERTIFICATE OF CORRECTION

PATENT NO. : 9,960,416 B2
APPLICATION NO. : 13/993901
DATED : May 1, 2018
INVENTOR(S) : Tomitaro Hara et al.

Page 1 of 1

It is certified that error appears in the above-identified patent and that said Letters Patent is hereby corrected as shown below:

On the Title Page

Item (73) Assignee: -- ELIIY POWER CO., LTD., (JP) -- should be added before SUMITOMO OSAKA CEMENT, CO., LTD. (JP)

Signed and Sealed this
Twenty-eighth Day of May, 2019

Andrei Iancu
*Director of the United States Patent and Trademark Office*